April 26, 1932.  D. C. KLAUSMEYER  1,855,193
OILPROOF SPINDLE END
Filed Sept. 17, 1927
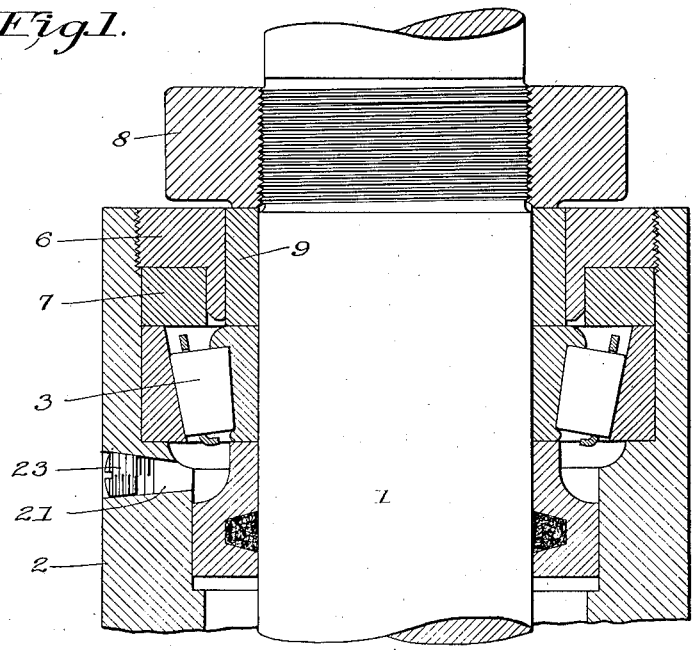
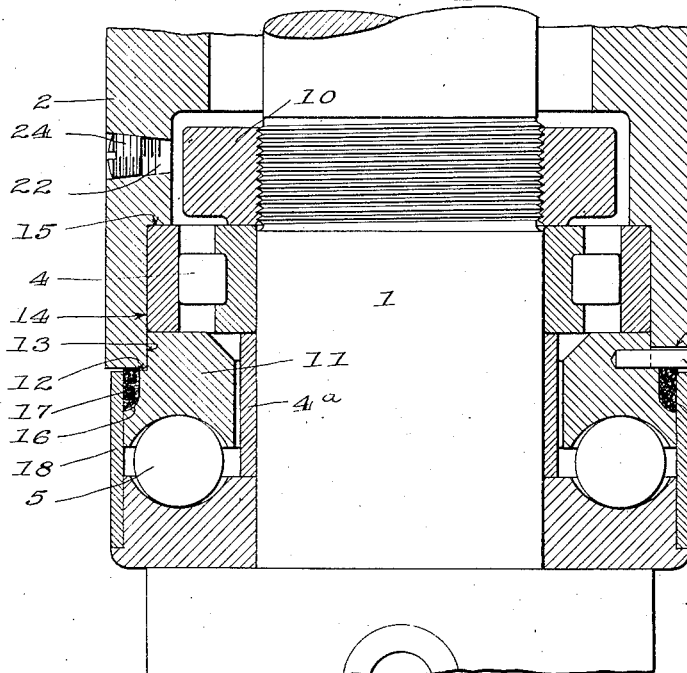
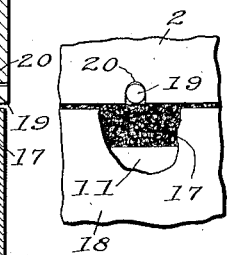
Inventor
David C. Klausmeyer
By Attorneys
Nathan & Bowman Patented Apr. 26, 1932

1,855,193

UNITED STATES PATENT OFFICE

DAVID C. KLAUSMEYER, OF CINCINNATI, OHIO, ASSIGNOR TO THE CINCINNATI-BICK-FORD TOOL COMPANY, OF OAKLEY, CINCINNATI, OHIO, A CORPORATION OF OHIO

OILPROOF SPINDLE END

Application filed September 17, 1927. Serial No. 220,074.

Various types of machines embody rotating elements which necessarily must be lubricated in order to prevent wear on the moving parts to maintain the efficiency and accuracy required. In a machine having a rotating as well as a translating spindle for instance, keeping it well oiled is a difficult problem in itself but to keep it oiled without having the lubricant fly off centrifugally is another problem of a different nature. One of the objects of my invention is to provide means to keep the oil from leaking out and splashing on the operator.

For the purpose of illustration I have shown my device incorporated with a vertical spindle such as that used in a radial drill but it is to be understood that it may be used to advantage on any revolving shaft similarly constructed.

A radial drill consists in general of a base having a column upon which is mounted for rotation or translation an arm carrying a slidable tool head. Within the tool head, and driven by a power shaft extending along the back of the arm, are two trains of change gears and a vertical rotatable and translatable spindle slidingly mounted in a non-rotating sleeve. The spindle projects from the casing of the head a considerable distance while in operation, at which time oil drips down over the swiftly rotating spindle and causing untidy appearances, annoyance to the operator and a waste of lubricant.

When the machine is running under no load whatsoever, the leakage is greater due to a slight amount of float or end play required between the parts of the spindle mounting. Due to this slight looseness of the parts, and especially when the tendency of the spindle to gravitate is not resisted by the back-pressure of a load, lubricant may seep to the periphery of the spindle through these small apertures and be centrifugally thrown off or drip down over the spindle end. Another important object of my invention is to prevent the lubricant from working out between the parts of the spindle bearing and being thrown off.

Spindle bearings of this type usually have a retainer casing around the outside of the exposed bearing, enclosing the same in order to keep out dust and dirt and also to form a reservoir of lubricant in which the balls or rollers of the bearing revolve. The retainer, however, must have a tight fit on one of the parts and must run freely on the other member which permits the lubricant to work out from the raceway between the relatively moving retainer and non-rotating member of the bearing. Another object of my invention is to provide means for preventing the lubricant from working out between the retainer and the parts of the bearing to the outside of the spindle and being thrown off. I accomplish this result by placing between the non-rotating part of the bearing and the moving retainer casing an annular felt washer which performs the dual function of preventing the oil from leaking out between the retainer ring and the bearing and also of preventing the oil from leaking out through the space between the face of the bearing and the non-rotating spindle sleeve.

To prevent one of the parts of the bearing from rotating relative to the spindle sleeve, a shoulder is formed thereon and a complementary recess is formed on the inside of the lower end of the spindle sleeve and by a pin and slot connection relative rotation between the two is prevented and still allowing the bearing to have a slight amount of axial float.

This shoulder on the bearing also performs two functions one being that it provides means for locking one of the parts against rotation and the other is that it forms an additional barrier to prevent the oil or grease from working out and being thrown tangentially from the bearing.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a sectional view of a spindle embodying my present invention. Fig. 2 is a detail view in elevation of the pin and slot connection between the spindle sleeve and the bearing race showing how the felt washer completely seals the opening between the two.

Referring more particularly to the drawings the invention is disclosed as constructed in a machine tool having a vertically arranged spindle but whether horizontally or vertically arranged the desired result may be obtained in the manner now to be described. Fig. 1 shows a fragmentary section of a rotatable spindle 1 mounted in a non-rotating but translatable sleeve 2. Since my invention in no way relates to the mechanism for rotating the spindle nor to the mechanism used to affect a translatory movement of the sleeve, detailed description thereof is deemed unnecessary. Suffice it to say that the upper end of the spindle 1 (not shown) has a splined connection with one of a train of change gears located intermediate the upper end of the sleeves 2 and the upper end of the spindle and this manner the spindle is rotated at various speeds. Axial movement of the spindle is affected by a rack and pinion connection with the sleeve, the rack (not shown) being secured to or cut on the sleeve 2 and the pinion (not shown) in mesh therewith and driven by a suitable feed train or by manual means. The spindle feed gears and the spindle rotating gears, in this particular machine are all carried in the head and driven from the arm shaft in a conventional manner, but it is understood that this invention contemplates any other appropriate driving means.

The spindle is held concentric with the sleeve 2 at its upper end by means of a roller thrust bearing 3 which takes any side thrusts and also carries the weight of the spindle. At its lower end the roller bearing 4 takes the side thrusts and maintains the spindle in alignment and the ball bearing 5 transmitting to the sleeve all the end thrust imparted to the spindle during a machining operation.

Lubricant for lubricating the bearings 3, 4 and 5 is conducted through the ports 21 and 22 and when the chambers surrounding the bearings are completely filled the plugs 23 and 24 are replaced until it is time to refill again.

The radial thrust bearing 3 is held in a recess formed in the upper end of the sleeve by means of a lock nut 6 threaded to the sleeve and pressing against an annular ring 7 which holds the outer race of the bearing securely in its seat. Adjustment for wear in the thrust bearings may be had by turning the adjusting nut 8, threaded to the spindle 1, against the bushing 9 which in turn presses against the inner race of the radial thrust bearing 3. The lower bearing 5 is held securely in its seat by means of the lock nut 10 pressing against the inner race of the radial bearing 4, against a bushing 4ª which is held against the lower race of the bearing 5.

However, if the adjusting nut 8 is tight, the spindle will bind and the bearings will become hot very quickly causing considerable damage to the machine, consequently the spindle must have a slight amount of float axially. When the spindle is idle and under no load the upper race 11 of the thrust bearing 5 drops slightly so that the lubricant passes between the face of the ball race 5 and the abutting end of the sleeve 2. In the construction shown in Fig. 1 a shoulder 12 is formed on the race ring 11 and the sleeve like portion 13 is slidingly fitted within a recess 14 in the end of the sleeve 2. End thrust on the spindle 1 is transmitted to the ball bearing 5, through the outer race of the roller bearing 4 to the shoulder 15 of the sleeve 2, no trust at all being transmitted through the shoulder 12 of the ball bearing to the extreme end of the spindle sleeve, a slight amount of clearance being provided at that point. By fitting the bearing within a bore of the sleeve as above described an additional barrier is formed to prevent the oil from leaking out and being thrown from the bearing.

In addition, I have completely sealed the opening between the lower end of the spindle sleeve and the upper race of the bearing 5 by placing in a peripheral recess 16 of the race 11 an annular felt washer 17 which effectually blocks any oil working down between the sleeve like portion of the race way 11 and the wall of the recess 14. The felt washer 17 also blocks any oil working up between the periphery of the race way 11 and the retainer ring 18. Thus it will be seen that the only way oil could get out of the bearing is through the places above described which is now prevented by means of the felt washer 17.

Another cause for the leaking of oil through this bearing is that the upper race 11 of the bearing 5 heretofore has been free to rotate and when the thrust on the tool end of the spindle is relieved the upper race 11 drops away slightly from the spindle sleeve and thus the oil is quickly led to the periphery of the bearing thru this small opening and thrown off. One way to overcome this imperfection is to insert a small stud or key 19 radially into the telescoping portion of the race 11 in such a manner that its outer end projects into an open slot 20 of the sleeve 2; the slot 20 being made sufficiently long so that no end thrust on the bearing is carried by the pin 18. Another way to prevent the upper race from rotating is to place a pin in a position parallel to the axis of the spindle and one end inserted in the race and the other end slidingly fitted into the spindle sleeve. Various other ways for locking the race against rotation may be employed but the construction shown on the drawings provides a simple and very effective locking device and thus reducing to a minimum the amount of oil that works out between these parts.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. In a device of the character described, a sleeve having a recess at one end; a spindle journaled within said sleeve; an anti-friction bearing between said sleeve and said spindle and fitted within said recess; and packing fitted in a channel formed in one of the races of said bearing to form an oil tight seal adjacent the end of said sleeve.

2. A machine tool combining; a translatable sleeve; a rotatable and axially movable spindle journaled therein and provided with a shoulder; an anti-friction bearing between the shoulder on said spindle and the end of said sleeve, said bearing comprising a lower ball race secured to said spindle and having an oil-proof contact therewith, a retainer casing secured to said lower ball race and having an oil proof contact therewith, and an upper ball race loosely mounted; inter-engaging means between the upper ball race and said sleeve to prevent relative rotation therebetween and to permit axial movement of said race; a lubricant chamber in said sleeve for supplying lubricant to said bearing; and sealing means at the junction of said sleeve, upper ball race, and retainer casing to prevent the escape of lubricant therefrom.

3. A machine tool combining; a sleeve member; a spindle member rotatably journaled therein and provided with a shoulder; an anti-friction bearing exposedly located between the shoulder on said spindle and the end of said sleeve, said bearing comprising a lower ball race surrounding said spindle and engaging the shoulder formed thereon and an upper ball race surrounding said spindle and engaging the end of said sleeve; a retainer casing surrounding said bearing and movable with one of the said races; means for lubricating said bearing; packing material between the retainer casing and said bearing to prevent the escape of lubricant therebetween; and interlocking means between the upper ball race and the end of said sleeve member to prevent relative rotation therebetween.

4. In combination with a spindle structure comprising a support and a spindle shaft journaled therein and projecting therefrom; an anti-friction thrust bearing exposedly located between the end of said support and said shaft; means for lubricating said bearing; and lubricant retaining means surrounding said thrust bearing for retaining the lubricant therein.

In witness whereof, I have hereunto subscribed my name.

DAVID C. KLAUSMEYER.